3,256,313
Patented June 14, 1966

3,256,313
BETA-HALOALKYL-AROMATIC-METHYL CYANIDES
John G. Abramo, Wilmington, Del., and Earl C. Chapin, Springfield, Mass., assignors to Monsanto Company, a corporation of Delaware
No Drawing. Filed May 22, 1963, Ser. No. 282,214
3 Claims. (Cl. 260—465)

The present invention concerns beta-haloalkyl-aromatic-methyl compounds and more particularly, beta-haloalkyl-aromatic-methyl cyanides.

This application is a continuation-in-part of our co-pending applications S.N. 790,052, filed January 30, 1959 and since abandoned, and S.N. 10,069, filed February 23, 1960, now abandoned.

Compounds which can serve directly as monomeric components in addition-type polymerizations, are continually being sought by practitioners in the synthetic polymer field. Of equal interest are compounds which can be expeditiously converted to monomeric components of this nature.

It is a principal object of the present invention to provide compounds which are convertible to monomeric components useful in addition-type polymerization reactions.

It is another object of the present invention to provide methods by which these materials can be produced.

Other objects of the invention will in part be obvious and will in part appear hereinafter.

These and other objects of the present invention are attained by the production of beta-haloalkyl-aromatic-methyl cyanides having the structure:

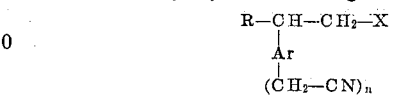

wherein Ar is an aromatic hydrocarbon radical containing 10–14 carbon atoms in the basic cyclic structures thereof, R is selected from the class consisting of hydrogen and methyl radical, X is a halogen and $n$ represents an integer of 1–3.

The following examples are given in illustration of the invention. Where parts are mentioned, parts by weight are intended unless otherwise described.

*Example I*

Fifty-eight grams of 9-(beta-chloroethyl)-10-chloromethyl anthracene dissolved in 300 ml. of acetone is charged to a 1-liter, 3-neck flask fitted with a stirrer, thermometer and reflux condenser. The solution is heated to reflux temperature prior to adding 10 grams of sodium cyanide through the top of the condenser in four 2.5 gram portions. This addition is carried on over a 2-hour period. Stirring and heating of the reaction mixture is continued for an additional 20 hours. After cooling to room temperature, the reaction product which results is diluted with 500 ml. of water; then extracted 4 times with 150 ml. portions of ether and the ether extracts combined. The combined extract is washed with water until the washings are neutral to litmus paper. It is then dried with magnesium sulfate and later filtered. The filtrate is evaporated to yield a dark-colored semisolid material. Recrystallization with ethanol in the presence of activated carbon yields a white solid material which is analyzed for carbon, hydrogen, nitrogen and chlorine. The values obtained together with infrared analysis establishes this material as 9-(beta-chloroethyl)-10-cyanomethyl anthracene.

*Example II*

The procedure and reactant amounts employed in Example I are repeated with the exception that 48 grams of 1-(beta-chloroethyl)-4-chloromethyl naphthalene is substituted in place of the 58 grams of 9-(p-chloroethyl)-10-chloromethyl anthracene used in that example. The product obtained after clarification and crystallization with activated carbon and ethanol is subjected to elemental and infrared analysis and is identified as 1-(beta-chloro-ethyl)-4-cyanomethyl naphthalene.

The present invention is directed to beta-haloalkyl-aromatic-methyl cyanides having the structure:

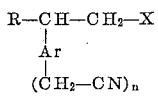

wherein Ar is an aromatic hydrocarbon radical containing 10–14 carbon atoms in the basic cyclic structure thereof, R is selected from the class consisting of hydrogen and methyl radical, X is a halogen and $n$ represents an integer of 1–3.

In accordance with the preceeding, the symbol Ar represents an aromatic radical which includes biphenyl, naphthyl, acenaphthenyl, anthryl and like cyclic radicals. The desired cyanides can be considered as having two types of primary substituents. The first of these is the haloalkyl-type substituent which is always singular in number and constitutes a haloethyl radical member when the symbol R represents a hydrogen, and a haloisopropyl radical when the symbol R represents a methyl radical. The halogen contained on the haloalkyl substitutent can be chlorine, bromine, iodine or fluorine with chlorine preferred. The other type of primary substituent, is that which will be preferred to as the methyl cyanide or cyanomethyl substituent which is terminated by a cyano radical. As indicated, the methyl cyanide substituent can be 1–3 in number in a given cyanide with a single substituent of this type preferred. The position of the methyl cyanide substituent on the aromatic radical represented by the symbol Ar can be varied. Thus, various position isomers resulting from changes carried out in positioning the primary substituents are intended to be included here. In illustration, taking the case of cyanides in which Ar represents a naphthylene radical and the methyl substituent is singular in number, the primary substituents can be positioned in 1,2, 1,3, 1,4, 1,5, 1,6, 1,7, 1,8, 2,3, 2,4, 2,5, 2,6, 2,7, 2,8, etc., positions in relationship to one another. In additon to the primary substituents described above, the aromatic radical represented by the symbol Ar can accommodate other nuclear substituents such as halogens and alkyl radicals.

Examples of the subject cyanides are 1-(beta-chloroethyl) - 4 - naphthylmethyl cyanide; 4-(beta-chloroethyl) - 4' - biphenylmethyl) cyanide; 9-(beta-chloroethyl)- 10 - anthrylmethyl cyanide; 9-(beta-chloroisopropyl)-10-anthrylmethyl cyanide and the various position isomers resulting from repositioning of the primary substituents, to wit: the haloalkyl and cyanomethyl substituents on the aromatic radical symbolized by Ar.

As indicated previously, the cyanides intended can contain 1–3 in number of the methyl cyanide or cyanomethyl substituents. Those with two cyanomethyl groups are represented by: 4,8-bis(cyanomethyl)-1-(beta-chloroethyl)-naphthalene; 4,8-bis(cyanomethyl)-1-(beta-chloroisopropyl)-naphthalene; 1,10-bis(cyanomethyl)-9-(beta-chloroethyl)-anthracene; 1,10-bis(cyanomethyl)-9-(beta-chloroisopropyl)-anthracene. With the presence of three cyanomethyl substituents, cyanides of the following type result: 4,5,8 - tris - (cyanomethyl)-1-(beta-chloroethyl) naphthalene; 4,5,8-tris(cyanomethyl)-1-(beta-chloroisopropyl)naphthalene; 1,8,10 - tris(cyanomethyl)-9-(beta-chloroethyl)anthracene and 1,8,10-tris(cyanomethyl)-9-(beta-chloroisopropyl)anthracene.

The beta-haloalkyl-aromatic-methyl cyanides can be produced by reacting the corresponding beta-haloalkylaromatic-methyl halide with $n$ equivalents of a base metal cyanide contained in a solvent, where $n$ is equal to the number of halomethyl substituents on the starting material designed for conversion to cyanomethyl substituents on the final cyanide product. Illustrative of this, 1 mol of 1-(beta-chloroethyl)-4-chloromethyl naphthalene is reacted with 1 equivalent of sodium cyanide contained in equal parts of methanol and water to produce 1-(beta-chloroethyl)-4-cyanomethyl naphthalene.

The beta-haloalkyl-aromatic-methyl cyanides of the present invention can be converted to alkylene-aromatic-acetic acids. Because of the unsaturation contained in the alkylene substituents of these acids, they can be homopolymerized or interpolymerized by addition-type polymerization reactions to produce useful polymeric materials.

Conversion of the beta-haloalkyl-aromatic-methyl cyanides to the alkylene-aromatic-acetic acids can be attained by a two-step reaction. In the first step the cyanides are caused to react with approximately three (3) equivalents of base, such as a potassium hydroxide in alcoholic medium to form the corresponding alkylene-aromatic-acetate salts. Acidification with inorganic acid such as sulfuric acid or hydrochloric acid will convert these salts to the acids. Illustrative of the preceding 1-(beta-chloroethyl)-4-cyanomethyl naphthalene is refluxed with 3 equivalents of potassium hydroxide in ethanol medium to form the intermediate potassium salt 1-vinylnaphthyl-4-acetic acid. Acidification with dilute sulfuric acid yields the 1-vinylnaphthyl-4-acetic acid.

The alkylene-aromatic-acetic acids in polymerized form have added attractiveness over more conventional polymers. This results from the presence of the carboxy groups on the polymer backbone of the former. These groups can serve as sites by which to bring about cross-linking of these polymers, and the improvement in properties which result from the same.

It will thus be seen that the objects set forth above among those made apparent from the preceding description are efficiently attained and since certain changes may be made in carrying out the above process or products without departing from the scope of the invention, it is intended that all material contained in the above description shall be interpreted as illustrative and not in a limited sense.

What is claimed is:
1. Beta-haloalkyl-aromatic-methyl cyanides having the structure:

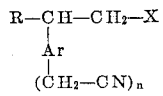

wherein Ar is an aromatic hydrocarbon radical selected from the class consisting of naphthalene and anthracene, R is selected from the class consisting of hydrogen and methyl radical, X is chlorine and $n$ represents an integer of 1–3.
2. 1-(beta-chloroethyl)-4-cyanoethyl naphthalene.
3. 9-(beta-chloroethyl)-10-cyanomethyl anthracene.

References Cited by the Examiner
UNITED STATES PATENTS
2,435,790  2/1948  Long.

OTHER REFERENCES
Conant et al.: The Chemistry of Organic Compounds, 4th edition, 1952, p. 549.
Mayer et al.: Deutsche Chemische Gesellschaft Berichte, 1922, vol. 55, pages 1835–1859.
Skinner et al.: J.A.C.S., 1951, vol. 73, pp. 2230–2233.
Wideqvist, Chemical Abstracts, 1948, vol. 42, p. 6349.
Wideqvist, Chemical Abstracts, 1949, vol. 44, p. 2446.

CHARLES B. PARKER, *Primary Examiner.*

DALE R. MAHANAND, *Assistant Examiner.*